Patented Sept. 22, 1936

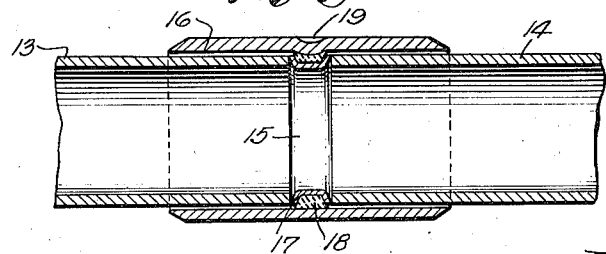
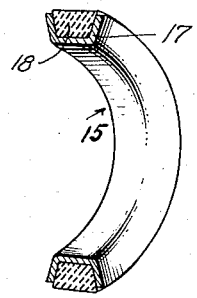
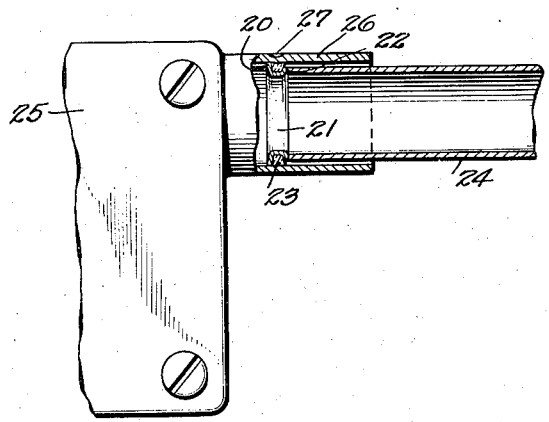
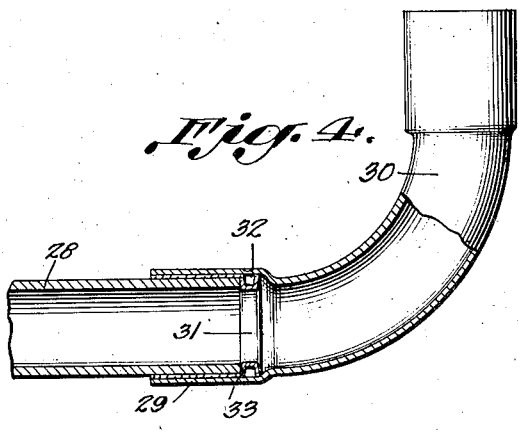
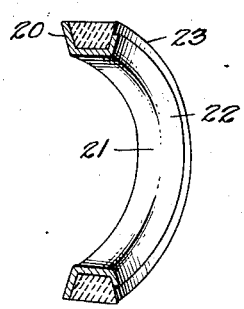

2,055,276

UNITED STATES PATENT OFFICE 2,055,276

PIPE JOINT OR COUPLING

Henry Winder Brownsdon, Birmingham, Frank Gee, Hazel Grove, Cheshire, and Howard Frank Wagstaff, Birmingham, England, assignors to Imperial Chemical Industries Limited, a corporation of Great Britain Application June 10, 1935, Serial No. 25,902
In Great Britain July 3, 1934

6 Claims. (Cl. 285—115)

This invention relates to pipe joints or couplings and in particular to soldered spigot and socket joints which may be adapted for coupling light copper or brass pipes for use in connection with domestic hot and cold water systems or electric cable conduit systems.

In spigot and socket joints of this kind it is known to employ a ring of solder which is completely embedded in a recess or groove provided in the socket coupling member or in the periphery of the pipe itself, a space or clearance being provided between the pipe and the coupling member of such a size as will induce capillary action on the solder when the latter is melted by applying heat to the joint. In such joints the provision of grooves involves expensive machining or deforming operations and in addition means usually have to be provided for positioning the pipes within the coupling member, which frequently necessitates machining a considerable amount of metal from the coupling member to form an internal collar against which the ends of the pipes abut.

The object of our invention is to provide improved pipe joints or couplings of simple construction which can be manufactured at a low cost and in which the pipes can be readily located within the sockets or couplings.

According to our invention we provide a pipe joint comprising a coupling member or sleeve the bore of which is constricted by a ring liner of metal which is made partly of solder or other readily fusible material adapted to unite the metallic parts, one or both sides of the said ring being adapted to form an abutment or abutments for the end or ends of the pipe or pipes. The ring may be secured within the sleeve by indenting the same at one or more points or circumferentially, or by expanding the ring liner, or by means of set screws, pins or the like projecting through the sleeve and engaging the liner, or by any other suitable means. The thickness of the liner is preferably such that when the pipes or conduits are placed in position it does not materially constrict the passage offered by the pipes or conduits.

The inside of the sleeve and/or the ends of the pipes are treated with a suitable flux and when external heat is applied to the sleeve the solder is melted and flows by capillary attraction into the narrow annular space between the sleeve and the enclosed portions of the pipes or conduits. The exuded solder which appears beyond the ends of the sleeve indicates that a satisfactory joint has been obtained.

The sleeve may be adapted for connecting two pipes together, or for connecting a pipe to a fitting such as a valve casing, or switch or junction box in the case of electric cable conduits. The fittings may have a projecting spigot portion of the same diameter as the pipe or conduit, or the sleeve may be integral with or attached to the rim of the orifice in the fitting.

Several applications of our invention are illustrated in the accompanying drawing, in which:—

Figure 1 is a longitudinal sectional elevation through a pipe joint constructed in accordance with our invention.

Figure 2 is a sectional perspective view of the ring liner shown in Figure 1.

Figure 3 is a part sectional elevation of a pipe joint for connecting a pipe to a junction box.

Figure 4 is a part sectional elevation of a pipe joint for connecting a pipe to an elbow fitting, showing the disposition of the solder after heat has been applied to the joint.

Figure 5 is a sectional view of the modified form of composite ring liner shown in Figures 3 and 4.

Referring to Figs. 1 and 2, the ends of the pipes 13 and 14 are arranged to abut against a ring liner 15 which is centrally disposed in a sleeve 16. The ring liner comprises an outer channel shaped portion 17 made of copper and an inner portion 18 formed of solder, the latter being preferably cut from a strip of metal of the required width and thickness, bent into the form of a ring and inserted in the channel groove. The flanged sides of the channel portion of the ring liner are made a few thousandths of an inch less in external diameter than the bore of the sleeve and the solder insert is arranged to stand slightly above the flange as shown in Figure 2. The composite ring is firmly held in position by indenting the sleeve in three positions, one such indentation being indicated at 19. During the indenting process a mandrel is inserted in the ring to prevent distortion of the channel portion and the slight compression of the solder ring by the indenting punches forces the solder to fill the small gap between the edges of the flanges and the wall of the sleeve, thus ensuring that a tight connection is made and that the solder will flow freely without impedance towards the ends of the sleeve when heat is applied.

Where pipes are required to be connected to fittings such as valves, junction boxes, elbows and the like, we prefer to construct the composite ring liner in such a manner that the solder is adapted to flow in one direction only, that is, away from the fitting towards the mouth of the socket. To this end we form the channel portion of the ring liner in the manner shown in Figure 5 in which one of the side flanges 20 of the channel portion 21 is made very nearly equal to the bore of the socket member of the fitting and the other side portion 22, which is adapted to form an abutment for the end of the pipe, is made of smaller diameter. A ring of solder 23 is located between the side flanges 21 and 22 as shown.

In applying this type of ring liner to a joint for connecting a pipe 24 to an electrical junction box 25, as illustrated in Figure 3, the composite ring is inserted in a socket 26 of the junction box with the larger flange 20 of the channel portion 21 adjacent to the body of the fitting. The ring is firmly positioned by means of indentations 27 in the manner previously described. The joint is treated with flux and the end of the pipe 24 is inserted in the socket so that it abuts against the small side flange 22. On heating the joint the solder 23 is prevented from flowing in the direction of the fitting by the flange 20 which is a close fit in the socket. The solder consequently flows freely by capillary attraction through the gap between the flange 22 and the socket towards the mouth of the said socket.

A further example of a soldered joint for connecting a pipe to a fitting is shown in Figure 4 in which a pipe 28 is joined to a socket member 29 formed at the end of an elbow fitting 30. A composite ring liner 31 of the kind described, having flanges of unequal diameter, is inserted as shown and is firmly held in position by indentations 32. After heating the joint the solder flows out of the channel portion of the ring into the annular space as indicated at 33.

It will be observed that in pipe joints of the type described, the sockets or coupling sleeves can very readily be made by cutting off short pieces of drawn metal tube of the required bore and length and the necessity for boring the sleeve or for machining any grooves or collars therein is entirely obviated. Moreover, when completed, the pipe joint provides a smooth internal bore substantially free from sharp edges and in the case of couplings for electric cable conduits the composite ring liner may be made slightly smaller in internal diameter than the bore of the conduit and the constricted portion of the ring rounded off internally so that the rough edges of the pipes are completely shielded and the cables can be threaded through the coupling without damage to the insulation.

We claim:—

1. A pipe joint comprising a socket member and a ring liner adapted to be inserted in said socket member and to constrict the bore thereof, thereby forming an abutment for a pipe to be inserted in said socket member, said ring liner comprising an outer channel shaped portion made of relatively infusible metal and an inner portion of readily fusible metal adapted to unite the parts of the joint, said fusible metal being initially located within a groove formed by the side flanges of the said channel shaped portion.

2. A joint for connecting a tubular member to a socket member, in which said socket member contains a ring liner comprising an outer channel shaped portion of relatively infusible metal and an inner portion of readily fusible metal adapted to unite the parts of the joint, said readily fusible metal being initially contained in a groove formed by the side flanges of said channel shaped portion, said side flanges being of slightly different diameter.

3. A joint for connecting tubular members comprising a sleeve member adapted to slip over the ends of said tubular members, and a ring liner located against longitudinal movement in said sleeve member and adapted to form an abutment for said tubular members, said ring liner comprising an outer channel shaped portion made of relatively infusible metal and an inner portion of readily fusible metal adapted to unite the parts of the joint, said readily fusible metal being initially contained in a groove formed by the side flanges of said channel shaped portion.

4. A joint for connecting tubular members comprising a sleeve member adapted to slip over the ends of said tubular members, and a ring liner located against longitudinal movement in said sleeve member and adapted to form an abutment for said tubular members, said ring liner comprising an outer channel shaped portion made of relatively infusible metal and an inner portion of readily fusible metal adapted to unite the parts of the joint, said readily fusible metal being initially contained in a groove formed by the side flanges of said channel shaped portion, and said channel shaped portion being rounded and of somewhat smaller diameter than that of said tubular members.

5. A ring liner adapted to be inserted in a tubular socket, comprising a channel shaped ring of relatively infusible metal containing a strip of readily fusible metal of the kind typified by solder.

6. A ring member adapted to be inserted in a tubular socket to effect a joint of the solder type, comprising a channel-shaped ring of relatively infusible metal provided with peripheral flanges, and a strip of readily fusible metal between said flanges, the external diameter of one of said flanges being smaller than that of the other flange.

HENRY WINDER BROWNSDON.
FRANK GEE.
HOWARD FRANK WAGSTAFF.